United States Patent [19]
Campbell, Jr.

[11] 3,776,052
[45] Dec. 4, 1973

[54] APPARATUS FOR MOLDING HOLLOW PLASTIC ARTICLES

[75] Inventor: Robert L. Campbell, Jr., Hickory, N.C.

[73] Assignee: Automated Manufacturing Systems, Inc., Hickory, N.C.

[22] Filed: Aug. 3, 1972

[21] Appl. No.: 277,914

Related U.S. Application Data

[63] Continuation-in-part of Ser. No. 108,416, Jan. 21, 1971, Pat. No. 3,683,416.

[52] U.S. Cl. ............................ 74/230.17 A, 74/660
[51] Int. Cl. ......................... F16h 55/22, F16h 1/28
[58] Field of Search ............... 74/63, 665 P, 217 R, 74/660, 230.17 A

[56] References Cited
UNITED STATES PATENTS
3,683,705   8/1972   Campbell, Jr................ 74/230.17 A Primary Examiner—Leonard H. Gerin
Attorney—Donald M. Seltzer

[57] ABSTRACT

An apparatus for rotating a hollow mold about a pair of mutually perpendicular axes to cast a hollow plastic article. The apparatus includes a rotatable shaft defining a first axis and which carries an L-shaped bracket at one end, with one leg of the bracket extending radially from the shaft and the second leg extending generally parallel to the shaft. A mold support member is connected to the second leg and is rotatable about a second axis which perpendicularly intersects the axis of the shaft. A first electric motor is provided for rotating the shaft, bracket, and thus a supported mold about the shaft axis, and a second electric motor independently rotates the mold about the second axis. The interconnection between the shaft and bracket is radially adjustable such that the center of the mold can be positioned at or closely adjacent the intersection of the two axes to thereby permit an essentially balanced rotation of the bracket and mold about the first axis of the apparatus.

11 Claims, 4 Drawing Figures

PATENTED DEC 4 1973 3,776,052
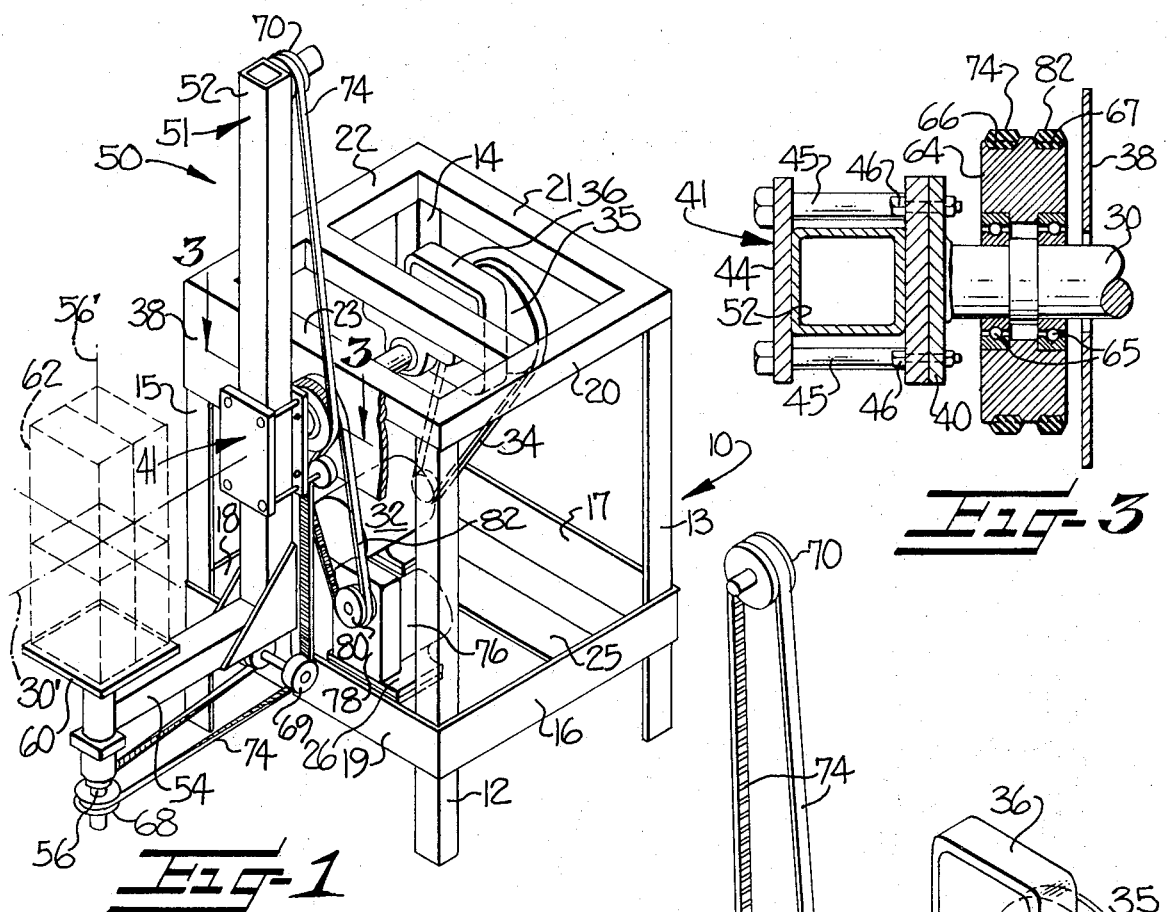
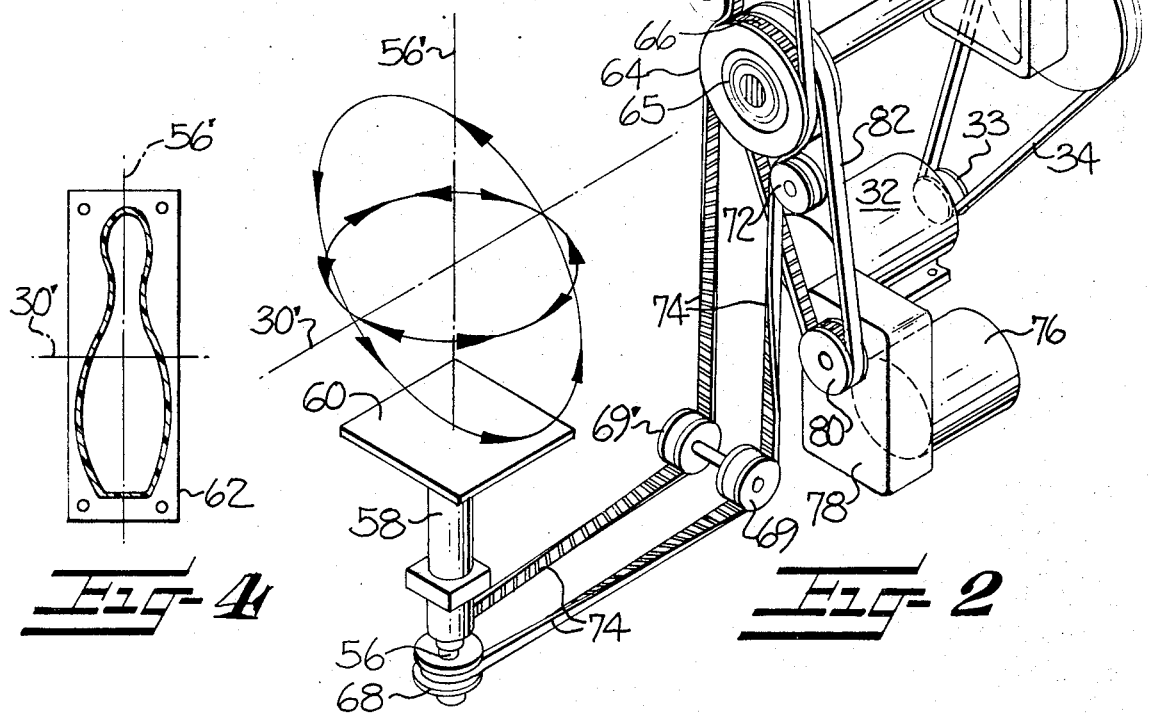

APPARATUS FOR MOLDING HOLLOW PLASTIC ARTICLES

This application is a continuation-in-part of application Ser. No. 108,416, filed Jan. 21, 1971, now U.S. Pat. No. 3,683,416.

The present invention relates to an apparatus for casting a hollow article from a thermoplastic or thermosetting resin or the like. More particularly, the invention relates to an apparatus for rotating molds of various shapes and sizes about a pair of intersecting axes to cast various hollow plastic objects.

In producing hollow plastic articles, such as plastic figurines, lamp bases, or toys, it is conventional practice to deposit a measured charge of a suitable plastic resin in a hollow sectional mold, and to then rotate the mold about a pair of mutually perpendicular axes such that the charge is distributed as a layer over the entire inner surface of the mold cavity. Upon setting of the resin, the mold is opened to permit removal of the finished product.

In applicant's co-pending application Ser. No. 108,416, there is described a molding apparatus of the above type which includes provision for adjustably positioning the center of the mold at or closely adjacent the intersection of the axes to thereby provide for the balanced operation of the machine. In addition, the above prior application discloses a drive belt arrangement for rotating the mold supporting platform about one of the axes of rotation, and the use of a variable diameter pulley associated with the drive belt arrangement for permiting a degree of control over the speed of rotation about such one axis relative to the speed of rotation about the other axis.

In many molding operations, it is desirable to have a greater degree of control over the relative speeds of rotation than is possible with the previously employed variable speed pulley. Thus, for example, in the case of certain molded articles, it may be desirable to obtain a thicker deposit of plastic along the side walls than along the end walls, and this can be accomplished by rotating the mold faster about the axis passing through the end walls. Also, it may be desirable to obtain an article which is heavier at one end than the other, such as in the case of a lamp base, and this can be accomplished by initially rotating the article about both axes, and then terminating completely the rotation about the horizontal axis so that the mold is left standing upright, while continuing rotation about the vertical axis.

It is accordingly an object of the present invention to provide an apparatus for rotating a hollow mold about a pair of intersecting axes, and having provision for selectively permitting a wide variation in the relative speeds of rotation about the two axes.

It is a further object of the present invention to provide a relatively lightweight apparatus for rotating a hollow mold about a pair of axes, and which is adapted to selectively mount molds of various sizes and shapes and to rotate the same under essentially balanced conditions.

It is a more specific object of the present invention to provide an apparatus for simultaneously rotating a mold about a pair of mutually perpendicular axes and having provision for positioning the center of the mold at or closely adjacent the intersection of the axes to thereby provide for the balanced operation of the machine whereby the heavy supporting structure employed in present apparatus of this type may be eliminated.

It is another object of this invention to provide a machine for molding a hollow plastic article which is simple in design and relatively inexpensive to manufacture.

These and other objects and advantages of the present invention are achieved in the embodiment illustrated herein by the provision of an apparatus which includes a rotatable shaft, and a L-shaped bracket connected at one end of the shaft. One leg of the bracket extends radially from the shaft and is adjustably connected thereto such that the radial extent thereof may be varied, and a second leg is connected to the radial extremity of the first leg and extends generally parallel to the shaft. The second leg includes means for supporting the mold for rotation about a second axis substantially perpendicular to the axis of the shaft, and first drive means are provided for rotating the shaft and connected mold about the shaft axis, and second independent drive means are provided for simultaneously rotating the mold about the second axis. By varying the radial extent of the bracket first leg, the first axis can be made to pass substantially through the center of the mold to thereby obtain essentially balanced rotation, and by selectively adjusting the speed of the two independent drive means, the relative speeds of rotation about the two axes may be varied.

Some of the objects and advantages of the invention having been stated, others will appear as the description proceeds, when taken in connection with the accompanying drawings, in which FIG. 1 is a perspective view of an apparatus embodying the features of the present invention;

FIG. 2 is a fragmentary perspective view illustrating the drive means of the apparatus shown in FIG. 1;

FIG. 3 is a fragmentary sectional view taken substantially along the line 3—3 in FIG. 1;

FIG. 4 is a sectional view of a typical hollow mold suitable for use with the present invention.

Referring more specifically to the drawings, the illustrated apparatus includes a generally rectangular supporting frame 10 comprising four vertical corner posts 12, 13, 14, 15, four lower interconnecting members 16, 17, 18, and 19, and four upper interconnecting members 20, 21, 22, and 23 defining a horizontal top surface. Lower support members 25 and 26 are connected between the lower members 16 and 18, and an upper support member 27 extends between members 20 and 22.

A horizontal shaft 30 is mounted by suitable bearings (not numbered) to the members 23 and 27, and is rotatably driven by a variable speed electric motor 32 mounted on the member 25. More particularly, the motor 32 includes a pulley 33 which acts to rotate the belt 34 and pulley 35. The pulley 35 in turn is connected to the shaft 30 through the reduction gear 36.

As best seen in FIG. 3, the shaft 30 extends through a plate 38 carried at the front of the apparatus, and has a transverse flange 40 connected thereto, as by welding. A mounting frame 41 is releasably connected to the flange 40 and includes a rear transverse plate 42 abutting the flange 40, a front transverse plate 44 carried in spaced relation to the flange 40, and four interconnecting bolts 45. The mounting frame 41 is releasably connected to the flange 40 by the bolts 46 such that frames of differing size may be readily attached to the shaft 30.

A turret 50 is connected to one end of the shaft 30 and is secured thereto by the mounting frame 41. The turret includes an L-shaped bracket 51 having a first leg 52 extending radially from the shaft and a second leg 54 perpendicularly connected at one end of the first leg so as to extend parallel to the shaft 30. The remote end of the second leg mounts a second rotatable shaft 56 which defines an axis 56' which perpendicularly intersects the axis 30' defined by the shaft 30. The shaft 56 is connected to the leg 54 by a suitable bearing 58 and mounts a mold supporting platform 60 which is adapted to retain the hollow mold 62.

The structure for rotating the shaft 56 and platform 60 about the axis 56' includes a first pulley 64 coaxially positioned about the shaft 30 immediately adjacent the flange 40. The pulley 64 is rotatably connected to the shaft 30 by means of the bearings 65 as seen in FIGS. 3, and includes two drive channels 66 and 67. In addition, a second pulley 68 is attached to shaft 56, a pair of guide pulleys 69, 69' are attached to the bracket adjacent to the interconnection of the two legs, a guide pulley 70 is attached adjacent the opposite end of the leg 52, and another pair of guide pulleys 72, 72' are carried by the rear transverse plate 42 and positioned on diametrically opposed sides of the first pulley 64 in the manner shown in FIG. 2. An endless belt 74 is entrained about all of these pulleys and engages the channel 66 of the pulley 64, the guide pulleys 72, 72' swing to guide a length of the belt 74 into the channel 66 along each side of the pulley 64 to thereby assure adequate frictional engagement therebetween.

The pulley 64 is operatively driven by a variable speed electric motor 76, this motor preferably being reversible. More particularly, the pulley 64 is driven by the motor 76 acting through the reduction gear 78, pulley 80, and drive belt 82 which in turn is in engagement with the second channel 67 of the pulley 64. If desired, the drive belts 34, 74 and 82 may be of a construction commercially known as "timing" belts to preclude slippage between the belt and associated pulleys.

In operation, a measured charge of a suitable plastic resin, such as a conventional exothermic thermosetting resin, is deposited within the hollow sectional mold 62, and mold is secured to the platform 60. A suitable retaining structure (not shown) for securing the mold to the platform is utilized to retain the mold in position during the casting operation.

To initiate the casting operation, the motor 32 is energized to rotate the shaft 30 and bracket 51 about the axis 30'. If the second motor 76 is not energized, the shaft 56 will be rotated about the axis 56' by the belt 74. More particularly, the pulley 64 will be held against rotation and will cause the belt 74 to be rotated about the various guide pulleys as the bracket 51 is rotated to thereby rotate the second pulley 68.

In this configuration, the machine would typically rotate the mold at a speed of about 9 rpm about the axis 30', and at a speed of about 27 rpm about the axis 56'. In order to selectively control the relative speeds of rotation about the two axes, the motor 76 is energized to rotate the pulley 64 at a predetermined speed and direction. Thus, for example, if the motor 76 is operated in one direction, the rotation of the mold 62 about the axis 56' will slow or stop altogether, and if the motor is operated in the opposite direction, the speed of rotation of the mold will increase. Thus, the two independent motors of the present invention permit a wide variation in the relative speeds of rotation about the two axes, and they can stop the rotation about either axis while maintaining rotation about the other.

As a particular example of the versatility achieved by the drive means of the present invention, it will be assumed that it is desired to mold a lamp base with a heavy lower end and a relatively light upper end. In such case, the mold would be rotated about both axes for a period of time to deposit the plastic material along all of the side walls of the mold, and then the motor 32 would be de-energized and the bracket 51 stopped and held at an angle of about 30° from the vertical. The motor 76 would continue to rotate the mold about the axis 56', thus allowing a portion of the plastic in he upper end of the mold to flow downwardly and be deposited along the side walls adjacent to the lower end thereof.

In order to insure the balanced operation of the machine, the radial extent of the bracket first leg 52 may be adjusted until the axis 30' is positioned to intersect the approximate center of the mold 62. When the belt 74 is a "timing" belt, such adjustment may require that the belt be slackened by a suitable release of the guide pulleys 69, 69', or guide pulley 70, to permit the belt to slip about the pulley 64. In this regard, it will be appreciated that positioning the axis 30' to intersect the center of the mold will not necessarily exactly balance the bracket 51 and mold. However, it has been found that so positioning these members will provide a sufficient degree of balance in most applications, and thus the center of the mold may be used as a convenient point of reference for this purpose. In addition, when the mold is centered about the axis 30' and also about the axis 56', the rotation of the mold will be essentially balanced which facilitates the quick and even distribution of the plastic in the mold cavity.

From the above description, it will be apparent that by providing for the essentially balanced rotation of the bracket 51 and mold 62 on the machine, the heavy supporting structure required in present machines of this type may be eliminated. Thus, the applicant has provided a small, lightweight, and relatively portable machine for rotating large molds of a type which presently require a much heavier and larger machine to effect rotation. Further, the applicant has provided a machine which is extremely versatile in the type of products which may be molded, such versatility resulting from the ability to selectively and independently control the speed of rotation of the mold about each of the axes.

By way of specific illustration, a typical machine embodying the present invention stands 47 inches high, the interconnecting members 20–23 form a rectangle measuring 29 inches by 32 inches, the first leg 52 measures 37 inches, and the second leg 54 measures about 22 inches. This machine is able to rotate a mold up to 60 inches in height and 38 inches in diameter without significant movement or vibration when the center of the mold is positioned at or closely adjacent the axis 30'.

In the drawings and sepcification, there has been set forth a preferred embodiment of the invention, and although specific terms are employed, they are used in a generic and descriptive sense only and not for purposes of limitation.

That which is claimed is:

1. An apparatus for rotating molds of various sizes about a pair of intersecting axes and at selective relative speeds to cast a hollow plastic object or the like comprising
- a rotatable shaft defining a first axis,
- a turret rotatable about said first axis and including a mold support means rotatable about a second axis intersecting said first axis,
- means connecting said turret to said shaft for concurrent rotation about said first axis and including means for adjusting said mold support means radially of said first axis to vary the position of a mold supported thereby relative to said first axis,
- first drive means for rotating said shaft and turret about said first axis, and
- second drive means operable independently of said first drive means for rotating said mold support means about said second axis.

2. The apparatus as defined in claim 1 wherein at least one of said first drive means and said second drive means includes means for varying the speed thereof.

3. The apparatus as defined in claim 2 wherein said turret further includes an L-shaped bracket having a first leg extending radially from said shaft and a second leg connected to said first leg and extending generally parallel to said shaft, said mold support means being carried by said second leg, and said means for adjusting said mold support means comprises means for adjustably connecting said first leg to said shaft such that the radial extent thereof may be varied.

4. An apparatus for rotating molds of various sizes about a pair of intersecting axes and at selective relative speeds to cast a hollow plastic object or the like comprising
- a first rotatable shaft defining a first axis,
- an L-shaped bracket having a first leg extending radially from said shaft and a second leg connected to said first leg and extending generally parallel to and spaced from said shaft,
- means for adjustably connecting said first leg to said first shaft such that the radial extent thereof may be varied,
- means for rotating said first shaft and connected bracket about said first axis,
- means for mounting a mold to said second leg of said bracket and including a second rotatable shaft defining a second axis perpendicularly intersecting said first axis, and
- means operable independently of said first shaft rotating means for rotating said second shaft about said second axis such that a mold mounted on said bracket may be rotated about said first and second axes at selective relative speeds and whereby a mold may be adjusted radially in relation to said first axis by adjusting the radial extent of said first leg.

5. The apparatus as defined in claim 4 wherein said means for rotating said second shaft comprises a first pulley rotatably mounted about said first shaft and coaxially about said first axis, a second pulley carried by and coaxial with said second shaft, an endless drive belt operatively extending between said first and second pulleys, and means for rotating said first pulley.

6. The apparatus as defined in claim 5 wherein said means for rotating said first shaft comprises a first variable speed electric motor, and said means for rotating said first pulley comprises a second variable speed electric motor.

7. The apparatus as defined in claim 6 wherein said second variable speed electric motor is reversible.

8. The apparatus as defined in claim 5 wherein said means for rotating said second shaft further comprises first guide pulley means attached to said bracket at one side of said first pulley and adjacent the connection of said first and second bracket legs for guiding said drive belt between said first and second pulleys, and second guide pulley means attached to the bracket first leg at the opposite side of said first pulley for maintaining the effective length of said drive belt when the radial extent of said first leg is varied.

9. The apparatus as defined in claim 8 wherein said means for adjustably connecting said first leg to said first shaft comprises a transverse flange connected to one end of said first shaft, a transverse plate carried in spaced parallel relation to said flange to receive said first bracket leg therebetween, and means for releasably clamping said first leg between said flange and said plate.

10. The apparatus as defined in claim 9 wherein said first pulley is positioned adjacent said flange, and further comprising third guide pulley means carried by said flange for guiding said endless belt about the periphery of said first pulley to assure frictional engagement therebetween.

11. The apparatus as defined in claim 10 wherein said third guide pulley means comprises third and fourth pulleys positioned on diametrically opposed sides of said first pulley.

* * * * *